(12) United States Patent
Yamamoto et al.

(10) Patent No.: US 7,570,547 B2
(45) Date of Patent: Aug. 4, 2009

(54) OBJECTIVE LENS UNIT AND OPTICAL PICKUP DEVICE

(75) Inventors: Shogo Yamamoto, Hachioji (JP); Yuichi Atarashi, Hachioji (JP); Yasutaka Nakagaki, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 522 days.

(21) Appl. No.: 11/507,002

(22) Filed: Aug. 21, 2006

(65) Prior Publication Data

US 2007/0067788 A1 Mar. 22, 2007

(30) Foreign Application Priority Data

Aug. 22, 2005 (JP) ............................. 2005-239759
Aug. 25, 2005 (JP) ............................. 2005-244222

(51) Int. Cl.
*G11B 7/00* (2006.01)

(52) U.S. Cl. .............................. 369/44.16; 369/112.24; 369/112.07; 369/112.08

(58) Field of Classification Search .............. 369/44.14, 369/44.15, 44.16, 44.23, 44.24, 44.32, 112.07, 369/112.08, 112.12, 53.19, 79; 359/814
See application file for complete search history.

(56) References Cited

U.S. PATENT DOCUMENTS

| | | | | |
|---|---|---|---|---|
| 4,988,165 A | * | 1/1991 | Ishii et al. .................... 359/814 |
| 5,511,049 A | * | 4/1996 | Goda ....................... 369/44.15 |
| 6,434,096 B1 | * | 8/2002 | Akagi et al. ............. 369/44.32 |
| 6,532,199 B1 | * | 3/2003 | Getreuer et al. .......... 369/44.14 |
| 6,980,504 B2 | * | 12/2005 | Yukawa .................. 369/112.12 |
| 2005/0201221 A1 | * | 9/2005 | Maeda et al. ............ 369/44.23 |
| 2005/0243663 A1 | * | 11/2005 | Nogami ................... 369/44.16 |
| 2005/0265192 A1 | * | 12/2005 | Andersen et al. ......... 369/53.19 |
| 2007/0242940 A1 | * | 10/2007 | Yumiki et al. ................. 396/79 |

* cited by examiner

*Primary Examiner*—Thuy N Pardo
(74) *Attorney, Agent, or Firm*—Finnegan, Henderson, Farabow, Garrett & Dunner, L.L.P.

(57) ABSTRACT

An objective lens unit, includes: an objective lens for irradiating and converging laser light on an optical disc as an a light information recording medium; and a lens frame for retaining the objective lens, wherein the lens frame is structured so that at least a portion closer to a rotation center of the optical disc is offset to an inner side of the lens frame with regards to a virtual edge section closer to the rotation center of the optical disc, wherein the virtual edge section is in a nodal line of a virtual plane that includes an end face which is closest to the optical disc in the lens frame and the objective lens, and that is perpendicular to an optical axis and a virtual rotation curved surface that is obtained when a virtual straight line passing a portion which is farthest from the optical axis in the lens frame and the objective lens, in parallel with the optical axis, is rotated around the optical axis as a center axis.

14 Claims, 12 Drawing Sheets

OBJECTIVE LENS UNIT AND OPTICAL PICKUP DEVICE

BACKGROUND OF THE INVENTION

1. Field of the Invention

The present invention relates to an optical pickup device by which at least one of reproduction and recording of information can be performed in an optical disc as an optical information recording medium, and an objective lens unit used for the optical pickup device.

2. Description of Related Art

Conventionally, optical discs have been known as an information recording medium. For example, Compact Disc (hereinafter also referred to as CD) and Digital Versatile Disc (hereinafter also referred to as DVD) have been widely used. Furthermore, a high density optical disc (hereinafter also referred to as next-generation DVD) using an objective lens having a numeric aperture (NA) of 0.8 or more also has been commercially available. These optical discs are based on different standards and thus have different distances from the surface of a disc to an information recording surface, different wavelengths of laser light to be used, and different NAs required for an objective lens for example. Thus, an optical pickup device that can access the plurality types of optical discs also have been marketed.

An objective lens included in an optical pickup device is designed so as to be movable in a direction perpendicular to a recording surface, for the purpose of focusing to a recording surface of an optical disc. An objective lens included in an optical pickup device is also designed so as to be movable in a radial direction for the purpose of tracking the optical disc.

With regards to the optical pickup device as described above, an optical pickup device as disclosed in Japanese Patent Unexamined Publication No. 2004-311004 for example has been known. According to this optical pickup device, a standard of an inserted optical disc is determined by detecting reflected light from the optical disc while allowing the objective lens to have a minimum number of numeric apertures to determine the type of the optical disc based on the detection result, thereby suppressing the objective lens from colliding with the disc surface.

Another optical pickup device as disclosed by Japanese Patent Unexamined Publication No. 2005-93070 for example also has been known. According to this optical pickup device, an optical head section supported by a wire suspension is selectively positioned and fixed while being spaced from an optical disc with a predetermined distance so that collision between the optical head section and a surface of the optical disc due to external impact can be prevented.

FIG. 12 is a view showing a schematic cross section of an optical disc D in the thickness direction. Although FIG. 12 exemplarily illustrates a CD, the dimension and scale in FIG. 12 are different from the actual ones.

In FIG. 12, the optical disc D has a disk-like shape having a diameter of 120 mm and includes a base made of polycarbonate resin or the like by an injection molding. Reference Numeral 1 denotes a surface of a base 2 from which information is read. Reference Numeral 3 denotes a reflective film of an aluminum film formed on an information recording surface. Reference Numeral 4 denotes a protection film provided on the reflective film 3. Reference Numeral 5 denotes a printing surface. Reference Numeral 6 denotes a stack ring. Reference mark H denotes a center hole. A region extending from a center C in a concentric manner and having a radius from 13 mm to 16.5 mm is a clamp region.

As shown in FIG. 12, the optical disc D includes a stack ring (also called as stack rim) 6 in order to prevent an information reading surface from being damaged when the optical disc D is stacked together with a plurality of optical discs. The stack ring 6 is formed to have a convex shape that has a radius from a center C of the optical disc D of 16.5 mm to 22 mm, that is concentric with the optical disc D, and that protrudes from a surface 1 from which information is read. An area external to a circle having a radius of 23 mm from the center C of the optical disc D is determined as a region to which information is recorded.

When the optical disc D having the shape as descried above is recorded with more information in such a manner that an objective lens is positioned closely as much as possible to an information recording region ranging from the center C to a radius of 23 mm, a problem that a risk in which the objective lens unit including a lens frame may interfere with the stack ring 6 protruding from the information reading surface 1 is increased, is caused.

This problem is more severe because when an objective lens has a short focal distance, a working distance (WD) (i.e., a distance between a surface of the optical disc and a final surface of the objective lens or a distance between the surface of the optical disc and a flange surface of the objective lens) is short.

Furthermore, when a versatile objective lens that can be used with a plurality types of optical discs is used with a disc based on a standard in which a thickness from an information-reading surface to an information recording surface is thick, an objective lens unit is closer to the information-reading surface of the disc. As a result, a higher risk of an interference between the objective lens and the stack ring, is caused.

The optical pickup devices described in the above patent documents are for the collision with the information-reading surface and thus cannot solve the problem of the interference between the stack ring and the objective lens unit.

SUMMARY OF THE INVENTION

In view of the above problem, it is an object of the present invention to provide an objective lens unit and an optical pickup device which can reduce the interference with the stack ring when the objective lens is moved to a position adjacent to a stack ring, even though a working distance is short.

In order to solve the above problem, in accordance with the first aspect of the present invention, an objective lens unit, comprises:

an objective lens for irradiating and converging laser light on an optical disc as an a light information recording medium; and a lens frame for retaining the objective lens, wherein the lens frame is structured so that at least a portion closer to a rotation center of the optical disc is offset to an inner side of the lens frame with regards to a virtual edge section closer to the rotation center of the optical disc, wherein the virtual edge section is in a nodal line of a virtual plane that includes an end face which is closest to the optical disc in the lens frame and the objective lens, and that is perpendicular to an optical axis and a virtual rotation curved surface that is obtained when a virtual straight line passing a portion which is farthest from the optical axis in the lens frame and the objective lens, in parallel with the optical axis, is rotated around the optical axis as a center axis.

Here, a portion of the lens frame closer to the rotation center of the optical disc means a portion that is closer to an optical disc and that is closer to the rotation center of the optical disc.

The inner side of the lens frame may be an inner side of a plane perpendicular to an optical axis of an objective lens unit or may be an inner side of a plane including the optical axis.

In the objective lens unit of the present invention, it is preferable that at least a part of an outer circumference section of the lens frame closer to the rotation center of the optical disc is corner-rounded.

In the objective lens unit of the present invention, it is preferable that a part of the lens frame closer to the rotation center of the optical disc has a reduced thickness.

In the objective lens unit of the present invention, it is preferable that the lens frame comprises a projection section for positioning the objective lens in a direction perpendicular to the optical axis except for a rotation center direction of the optical disc.

In the objective lens unit of the present invention, it is preferable that the objective lens comprises a flange section;

the lens frame retains the objective lens by a surface of the flange section on a light source side; and an outer circumference of the flange section is exposed at at least a part of the lens frame closer to the rotation center of the optical disc.

In this objective lens unit, it is preferable that the surface of the flange section on the light source side comprises an engagement section for engaging with the lens frame to position the objective lens in a direction perpendicular to the optical axis.

In the objective lens unit of the present invention, it is preferable that the objective lens unit comprises two optical elements; and the lens frame is integrated with one of the optical elements.

In accordance with the second aspect of the present invention, an optical pickup device comprises a light source and an objective lens unit, wherein the objective lens unit comprises:

an objective lens for irradiating and converging laser light on an optical disc as an a light information recording medium; and a lens frame for retaining the objective lens, wherein the lens frame is structured so that at least a portion closer to a rotation center of the optical disc is offset to an inner side of the lens frame with regards to a virtual edge section closer to the rotation center of the optical disc, wherein the virtual edge section is in a nodal line of a virtual plane that includes an end face which is closest to the optical disc in the lens frame and the objective lens, and that is perpendicular to an optical axis and a virtual rotation curved surface that is obtained when a virtual straight line passing a portion which is farthest from the optical axis in the lens frame and the objective lens, in parallel with the optical axis, is rotated around the optical axis as a center axis.

In the optical pickup device of the present invention, it is preferable that at least a part of an outer circumference section of the lens frame closer to the rotation center of the optical disc is corner-rounded.

In the optical pickup device of the present invention, it is preferable that a part of the lens frame closer to the rotation center of the optical disc has a reduced thickness.

In the optical pickup device of the present invention, it is preferable that the lens frame comprises a projection section for positioning the objective lens in a direction perpendicular to the optical axis except for a rotation center direction of the optical disc.

In the optical pickup device of the present invention, it is preferable that the objective lens comprises a flange section;

the lens frame retains the objective lens by a surface of the flange section on a light source side; and an outer circumference of the flange section is exposed at at least a part of the lens frame closer to the rotation center of the optical disc.

In this optical pickup device, it is preferable that the surface of the flange section on the light source side comprises an engagement section for engaging with the lens frame to position the objective lens in a direction perpendicular to the optical axis.

In the optical pickup device of the present invention, it is preferable that the objective lens unit comprises two optical elements; and the lens frame is integrated with one of the optical elements.

According to the present invention, it is possible to provide an objective lens unit and an optical pickup device which can reduce the interference with the stack ring when the objective lens is moved to a position adjacent to a stack ring, even though a working distance is short.

BRIEF DESCRIPTION OF THE DRAWINGS

The present invention will become fully understood from the detailed description given hereinafter and the accompanying drawings given by way of illustration only, and thus are not intended as a definition of the limits of the present invention, wherein.

PREFERRED EMBODIMENT OF THE INVENTION

Hereinafter, the present invention will be described by way of embodiments. However, the present invention is not limited to the embodiments.

Figure 1:
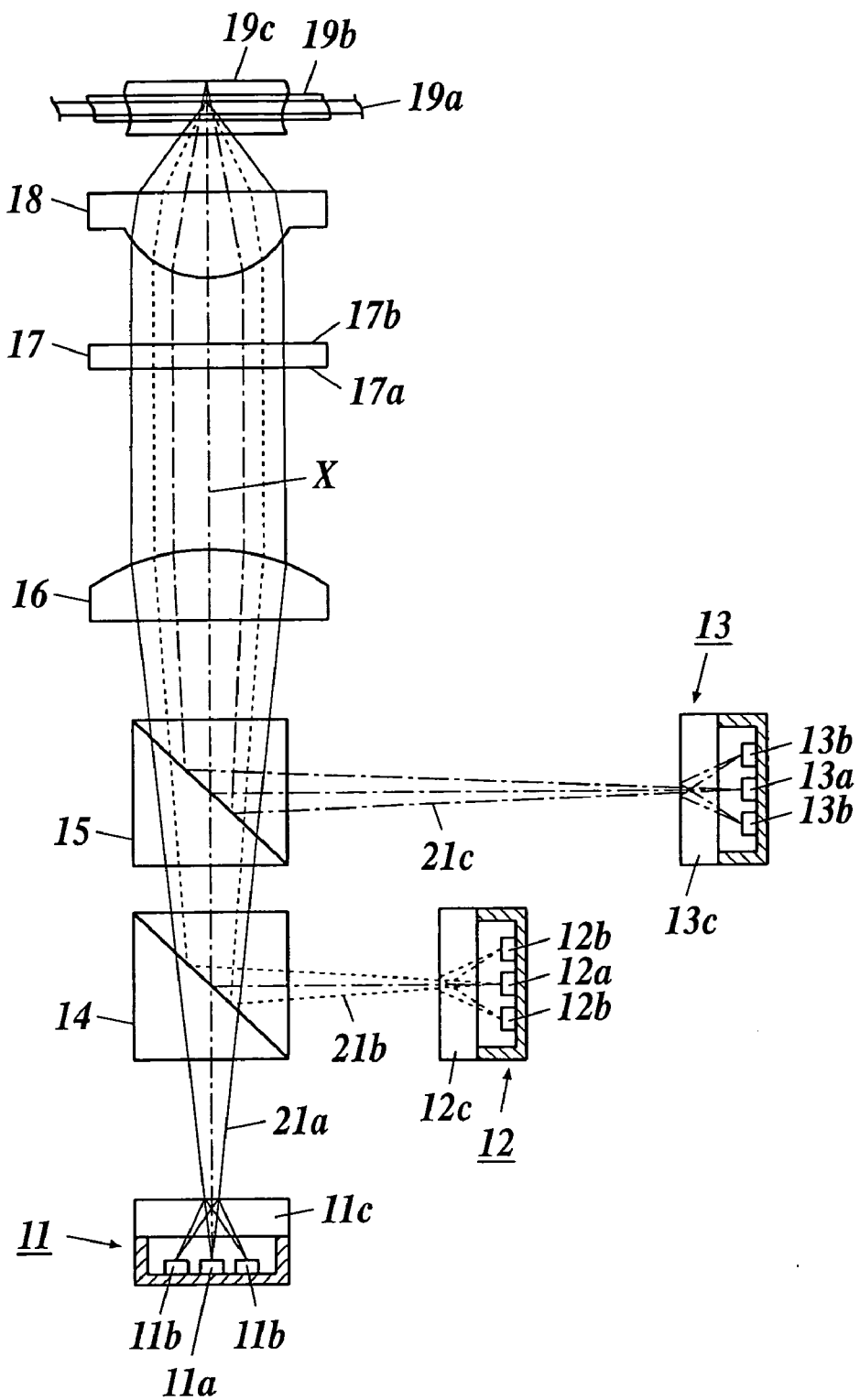
FIG. 1 is a schematic view illustrating an example of an optical pickup device according to this embodiment.

FIG. 1 is a schematic diagram illustrating an example of an optical pickup device according to this embodiment. In FIG. 1, Reference Numeral 11 denotes the first semiconductor laser module that is provided at the lower part of FIG. 1. The first semiconductor laser module 11 has a box-like shape having a bottom in which the first semiconductor laser 11a is provided at the center of the bottom and the first light detectors 11b are provided on both sides of the first semiconductior laser 11a. The first hologram 11c is provided on the surface of the module so as to cover the module. The first semiconductor laser 11a irradiates light beam 21a having a wavelength of $\lambda 1 = 405$ nm (shown by the solid line) toward the upper side of FIG. 1.

At the upper-right side of the first semiconductor laser module 11, the second semiconductor laser module 12 is provided. The second semiconductor laser module 12 has a box-like shape having a bottom in which the second semiconductor laser 12a is provided at the center of the bottom and the second light detectors 12b are provided on both sides of the second semiconductior laser 12a. The second hologram 12c is provided on the surface of the module so as to cover the module. The second semiconductor laser 12a irradiates light beam 21b having a wavelength of $\lambda 2 = 650$ nm (shown by the broken line) toward the left side of FIG. 1.

At the upper-right side of the second semiconductor laser module 12, the third semiconductor laser module 13 is provided. The third semiconductor laser module 13 has a box-like shape having a bottom in which the third semiconductor laser 13a is provided at the center of the bottom and the third light detectors 13b are provided on both sides of the third semiconductor laser 13a. The third hologram 13c is provided on the surface of the module so as to cover the module. The third semiconductor laser 13a irradiates light beam 21c having a wavelength of $\lambda 3 = 780$ nm (shown by the dashed line) toward the left side of FIG. 1. Although is this embodiment a laser, a detector, and hologram are provided as a module, the present invention is not limited to this. For example, the respective members also may be provided separately.

The light beam 21a irradiated from the first semiconductor laser 11a and the light beam 21b irradiated from the second semiconductor laser 12a pass a common light path by a beam splitter 14 having a substantially cube-like shape provided at a position at which the respective light paths intersect. Thus, the light beam 21a and the light beam 21b have a common optical axis X extending to an optical disc as an optical information recording medium. The light beam 21c irradiated from the third semiconductor laser 13a has the same light path as those of the light beams 21a and 21b by the substantially cube like-shaped beam splitter 15 that is provided at a position at which the respective light paths intersect. Thus, the respective light paths commonly have the optical axis X.

The respective light beams are caused to be parallel light rays by a collimating lens 16 provided at the upper side. Then, these parallel light rays are focused by a circular plate-like diffractive optical element 17 and an objective lens 18 that is an optical element having an imaging function. The circular plate-like diffractive optical element 17 and the objective lens 18 are provided at the upper side. The objective lens 18 has a convex shape remarkably protruding toward the lower side of FIG. 1 (opposite side of the optical disc). The beam splitters 14 and 15 function as an optical element that splits or merges light beams by a wavelength-selective interference film.

The light beam 21a having the wavelength $\lambda 1$ irradiated from the first semiconductor laser 11a is imaged at the information recording surface of the first optical disc 19a. The light beam 21b having the wavelength $\lambda 2$ irradiated from the second semiconductor laser 12a is imaged at the information recording surface of the second optical disc 19b. The light beam 21c having the wavelength $\lambda 3$ irradiated from the third semiconductor laser 13a is imaged at the information recording surface of the third optical disc 19c.

The first optical disc 19a is a next-generation DVD having a thickness from the surface to the recording surface (cover layer) of 0.1 mm. The second optical disc 19b is a conventional DVD having a thickness from the surface to the recording surface of 0.6 mm. The third optical disc 19c is a CD having a thickness from the surface to the recording surface of 1.2 mm. FIG. 1 only illustrates the thicknesses of the respective optical discs. Although FIG. 1 illustrates the optical discs 19a, 19b and 19c together for convenience, they are used separately in an actual case.

The light beam 21a having the wavelength $\lambda 1$ reflected by the first optical disc 19a passes the light path in a reverse direction to return to the first semiconductor laser module 11 and the light path is bent by the first hologram 11c. Then, the light beam 21 goes into the first light detector 11b and an optical signal is detected by the first light detector 11b. The light beam 21b having the wavelength $\lambda 2$ reflected by the second optical disc 19b passes the light path in a reverse direction to return to the second semiconductor laser module 12 and the light path is bent by the second hologram 12c. Then, the light beam 21b goes into the second light detector 12b and an optical signal is detected by the second light detector 12b. The light beam 21c having the wavelength $\lambda 3$ reflected by the third optical disc 19c passes the light path in a reverse direction to return to the third semiconductor laser module 13 and the light path is bent by the third hologram 13c. Then, the light beam 21c goes into the third light detector 13b and an optical signal is detected by the third light detector 13b.

The diffractive optical element 17 is a single element that has the first diffracting plane 17a at the incidence side and the second diffracting plane 17b at the emission side. The light beam 21a having the wavelength $\lambda 1$ and the light beam 21c having the wavelength $\lambda 3$ go straight through the first diffracting plane 17a without being diffracted and the light beam 21b having the wavelength $\lambda 2$ is diffracted by the first diffracting plane 17a. The light beam 21a having the wavelength $\lambda 1$ and the light beam 21b having the wavelength $\lambda 2$ go straight through the second diffracting plane 17b without being diffracted and the light beam 21c having the wavelength $\lambda 3$ is diffracted by the second diffracting plane 17b.

The objective lens 18 is designed so that, when the light beams 21a having the wavelength $\lambda 1$ pass through the objective lens 18 in parallel, the light beams 21a are imaged at the first optical disc 19a having a thickness of 0.1 mm. The light beam having the wavelength $\lambda 1$ goes straight through the diffractive optical element 17 without being diffracted and the waterfront is not influenced. Thus, this light beam is allowed by the objective lens 18 to be imaged at the first optical disc 19a.

When the light beam 21b having the wavelength $\lambda 2$ is diffracted by the first diffracting plane 17a of the diffractive optical element 17, spherical aberration is caused and the diffracted light is caused to be a divergent ray. When the divergent ray is inserted to the objective lens 18, spherical aberration is also caused. These spherical aberrations cancel spherical aberration caused by a difference in the thickness of an optical disc and a difference in the wavelength, thereby providing an imaging at the second optical disc 19b having the thickness of 0.6 mm.

When the light beam 21c having the wavelength $\lambda 3$ is diffracted by the second diffracting plane 17b of the diffractive optical element 17, spherical aberration is caused and the diffracted light is caused to be a divergent ray. When the divergent ray is inserted to the objective lens 18, spherical aberration is also caused. These spherical aberrations cancel spherical aberration caused by a difference in the thickness of an optical disc and a difference in the wavelength, thereby providing an imaging at the third optical disc 19c having the thickness of 1.2 mm.

In other words, this example illustrates an example of a versatile optical pickup device that can use the single diffractive optical element 17 and the objective lens 18 to work with a CD, a DVD, and a next-generation DVD.

Figure 2:
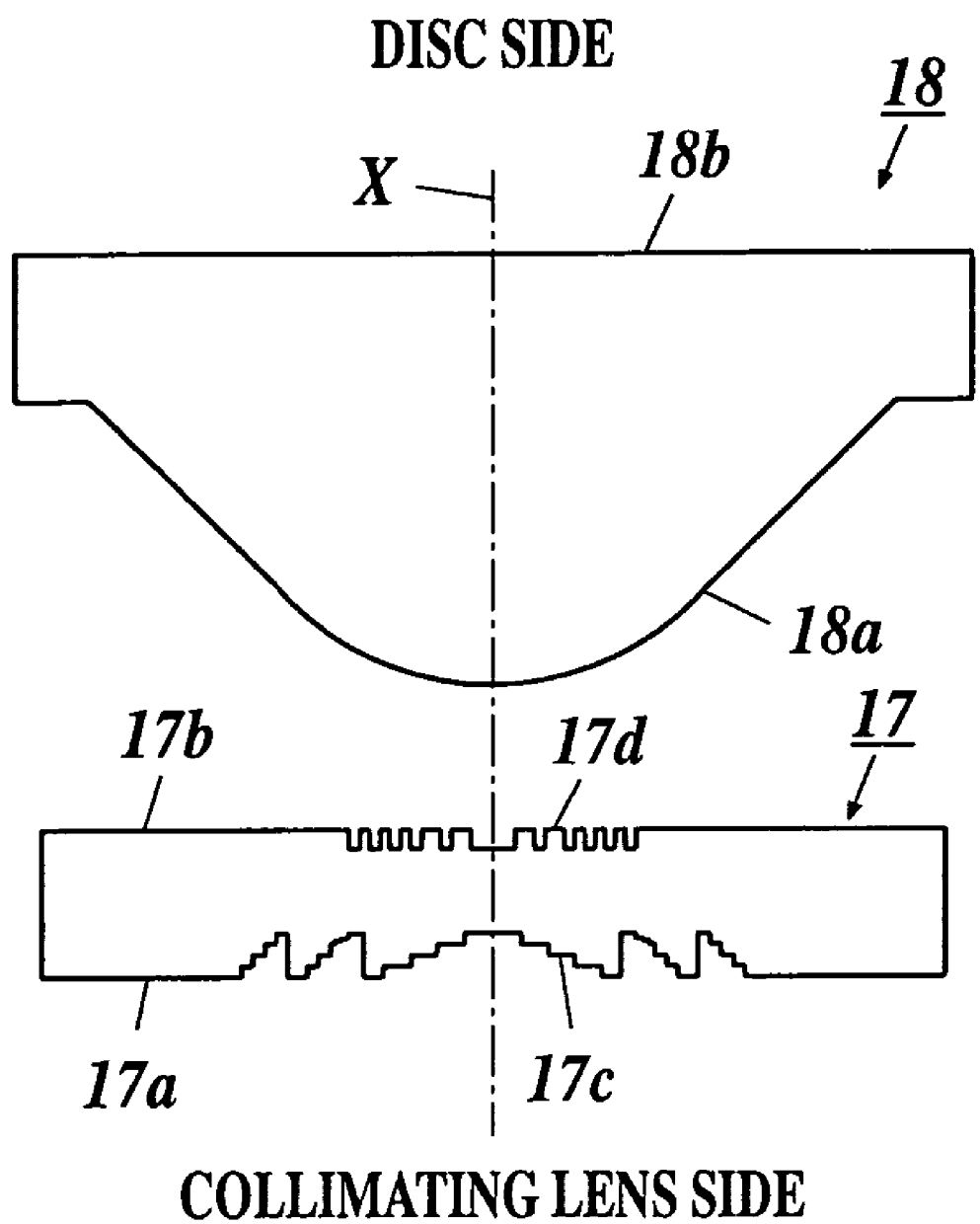
FIG. 2 is a schematic cross sectional view illustrating an example of a diffractive optical element and an objective lens according to this embodiment.

FIG. 2 is a cross-sectional view exemplarily illustrating the diffractive optical element 17 and the objective lens 18 of this embodiment.

As shown in FIG. 2, the objective lens 18 has a lens surface 18a that is a convex surface remarkably protruding toward the collimating lens 16. A lens surface 18b on the disc side also may be a convex surface. However, the lens surface 18a mainly provides a refractive power.

The diffractive optical element 17 has a diffracting plane 17a on the collimating lens side. The diffracting plane 17a includes grating sections 17c having a step-like cross section provided in a concentric circle-like manner. A diffracting plane 17b on the objective lens 18 side includes grating sections 17d provided in a concentric circle-like manner. A grating section 17c has a step-like shape in which four steps are provided. A grating section 17d has a step-like shape in which one step is provided. The diffracting plane 17a and the diffracting plane 17b also may be arranged in a reverse manner.

The diffractive optical element 17 and the objective lens 18 as described above are retained by a lens frame, thereby providing an objective lens unit.

Figure 3A:
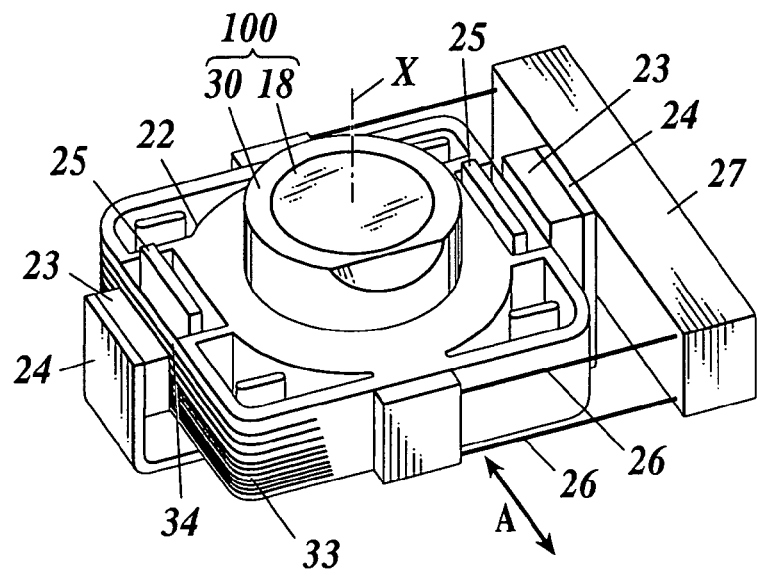
FIGS. 3A and 3B schematic views illustrating an example of an optical head section of an optical pickup device according to this embodiment.
Figure 3B:
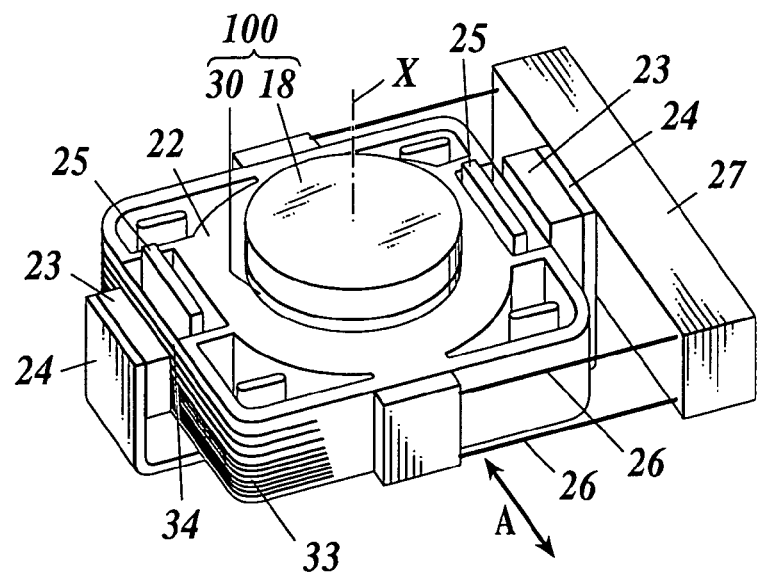

FIG. 3A and FIG. 3B are schematic views illustrating an optical head section of an optical pickup device according to this embodiment, respectively. In the drawings, in order to avoid the duplication of the explanation, the same members are denoted with the same reference numerals to explain the members.

In FIG. 3A and FIG. 3B, an objective lens unit 100 comprises a diffractive optical element (not shown) having an optical axis X; an objective lens 18; and a lens frame 30 for retaining them. The objective lens unit 100 is supported by and adhered to an objective lens supporting member 22. The objective lens supporting member 22 is supported by four flexible wires 26 extending from a supporting holder 27. Thus, by using the wires 26 as a suspension, the objective lens supporting member 22 can be swung in a predetermined range in a focusing direction as an optical axis direction and a tracking direction perpendicular to the optical axis X.

An outer circumference of the objective lens supporting member 22 is wound with a focus driving coil 33. A magnetic circuit comprises an outer yoke 24, an inner yoke 25, and a magnet 23 and includes a tracking driving coil 34. These focus driving coil 33 and tracking driving coil 34 work as an actuator. Thus, when the focus driving coil 33 and tracking driving coil 34 are supplied with power, the objective lens supporting member 22 can be swung in the two directions which are the direction of the optical axis X and the direction perpendicular to the optical axis X. These coils are supplied with power via the wires 26.

This optical head section can be moved, by a tracking mechanism (not shown), within an information recording region of an optical disc in a radius direction (which is shown by an arrow in FIG. 3A and FIG. 3B). In FIG. 3A and FIG. 3B, the rotation center of the optical disc is provided at "A" side.

Next, the shape of the objective lens unit 100 of the present invention will be described in more detail.

As shown in FIG. 4A to FIG. 11B, this objective lens unit 100 is structured so that a portion 300 in the lens frame 30 that is at least closer to the rotation center of an optical disc is offset at an inner side of the lens frame 30 to a virtual edge section k4 closer to the rotation center in the objective lens unit 100.

Here, the virtual edge section k4 is an edge section that is at a nodal line of the virtual plane k1 and the virtual rotation curved surface k3 and that is closer to the rotation center of the optical disc. The virtual plane k1 is a virtual plane that includes an end face 101 closest to the optical disc in the lens frame 30 and the objective lens 18 and that is perpendicular to the optical axis X. The virtual rotation curved surface k3 is a virtual rotation curved surface that is obtained when a virtual straight line k2 passing the portion 102 in the lens frame 30 and the objective lens 18 farthest from the optical axis X while being in parallel with the optical axis X is rotated around this optical axis X as a center axis. In FIG. 4A to FIG. 11B, the direction having the rotation center of the optical disc is represented by an arrow A and a grating section of the diffractive optical element 17 is not shown.

Hereinafter, a specific example of the objective lens unit 100 as described above will be described.

First, with reference to FIG. 4A to FIG. 5B, an objective lens unit will be exemplarily described in which at least a part of an outer circumference section closer to the rotation center of an optical disc of a lens frame is corner-rounded.

Figure 4A:
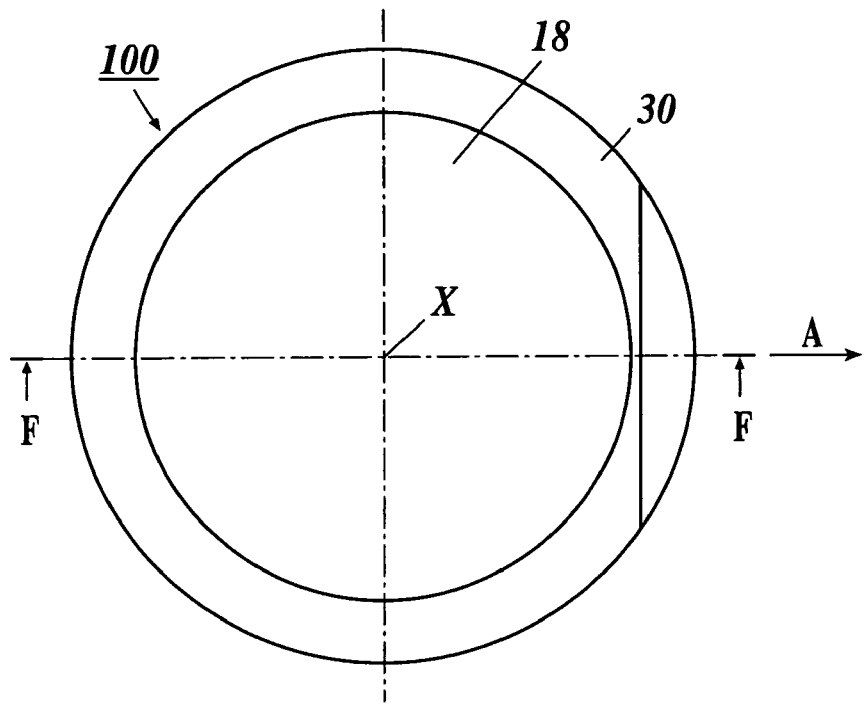
FIGS. 4A and 4B illustrate an example of the shape of the objective lens unit according to this embodiment.
Figure 4B:
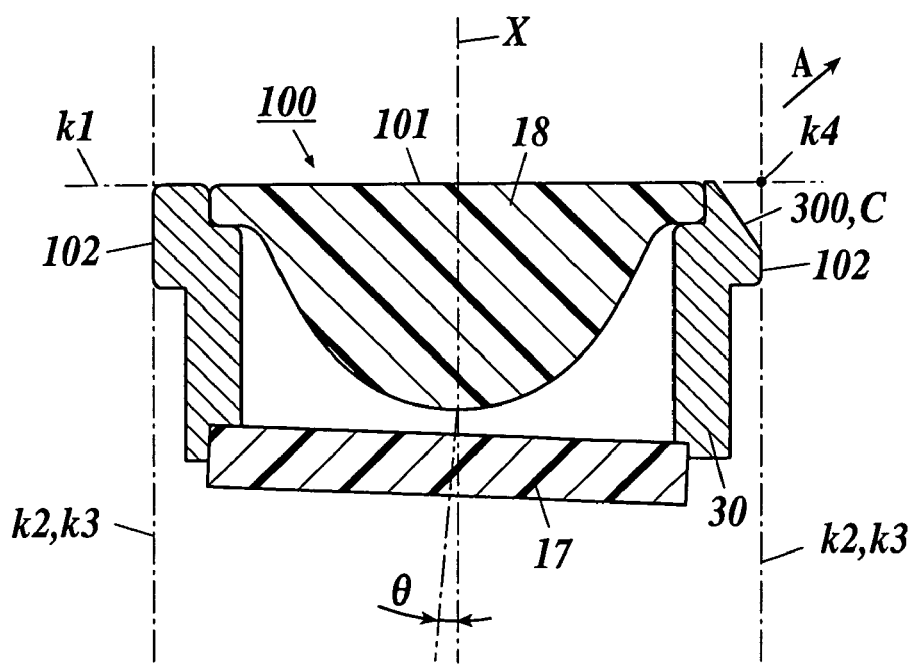

FIG. 4A and FIG. 4B illustrate an example of the shape of the objective lens unit 100 according to this embodiment. More specifically, FIG. 4A is a front view illustrating the objective lens unit 100 seen from a disc. FIG. 4B is a cross-sectional view illustrating the objective lens unit 100 cut at the line F-F shown in FIG. 4A.

In the objective lens unit 100, the lens frame 30 retains the diffractive optical element 17 and the objective lens 18. As shown by "C" in FIG. 4B, an outer circumference of the lens frame 30 closer to a direction having the rotation center of the optical disc (direction shown by the arrow A) is chamfered.

The shape as described above can avoid an interference between the lens frame 30 of the objective lens unit 100 and a stack ring protruding from an information-reading surface. Thus, the objective lens unit can be closer to the rotation center of a predetermined information recording region of an optical disc. This can prevent, even in the case of an objective lens unit having a short working distance (WD), an interference with a stack ring, thus providing an objective lens unit that can record more information.

Figure 5A:
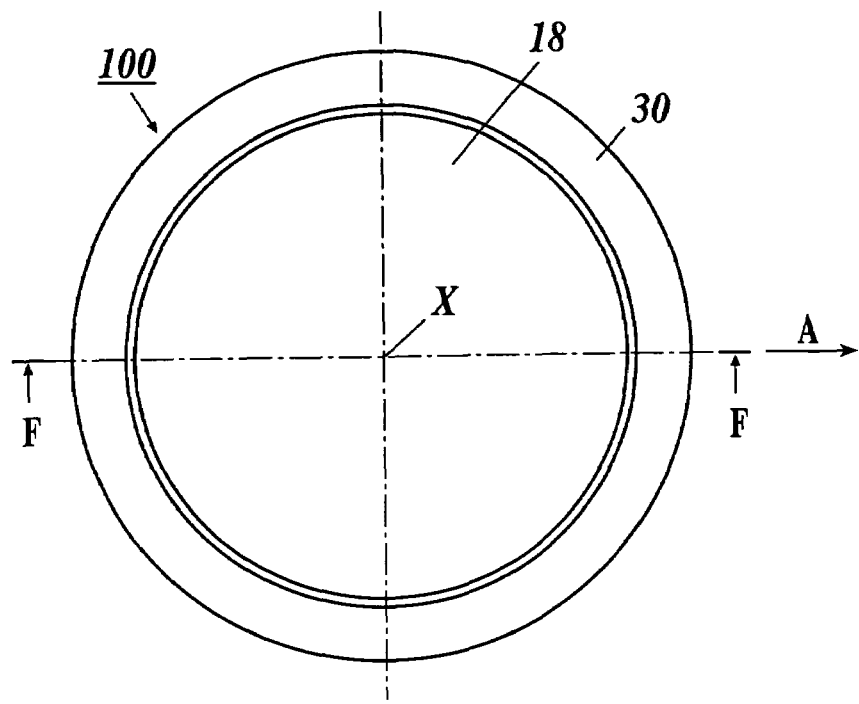
FIGS. 5A and 5B illustrate another example of the shape of the objective lens unit according to this embodiment.
Figure 5B:
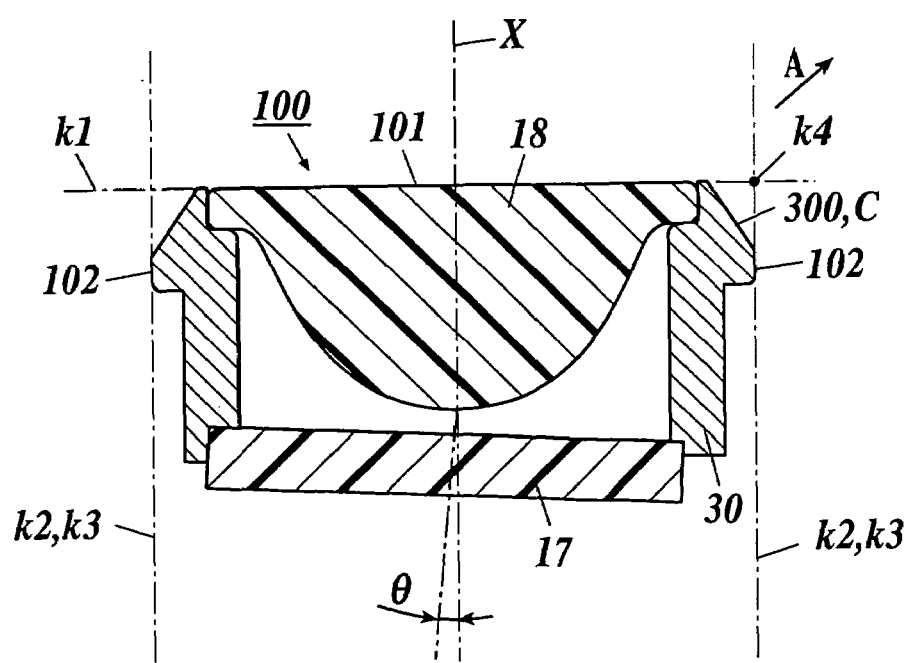

FIG. 5A and FIG. 5B illustrate another example of the objective lens unit 100 according to this embodiment. More specifically, FIG. 5A is front view of the objective lens unit 100 seen from a disc. FIG. 5B is a cross-sectional view cut at the line F-F shown in FIG. 5A.

FIG. 5A and FIG. 5B illustrate an outer circumference section of the lens frame 30 on the optical disc side, which is chamfered over the entire circumference. When the lens frame 30 is formed by a resin molding, the lens frame 30 can have a stable shape with a good balance and a high accuracy. At the same time, mass balance of the objective lens unit is secured and thus the swing by the wire suspension can be provided smoothly.

Although "corner rounding" or "chamfering" in the above description are preferably provided to the respective shapes while these shapes are being formed from a viewpoint of cost, "corner rounding" or "chamfering" also may be subsequently provided to a once-manufactured lens frame. What is important is that a complete shape is corner-rounded in the case of the corner-rounded shape for example. This also applies to other shapes described later and these other shapes also can be previously or subsequently formed by the manner as described above.

Next, an example of an objective lens unit will be described in which a part closer to the rotation center of an optical disc of a lens frame is shaped with a reduced thickness.

Figure 6A:
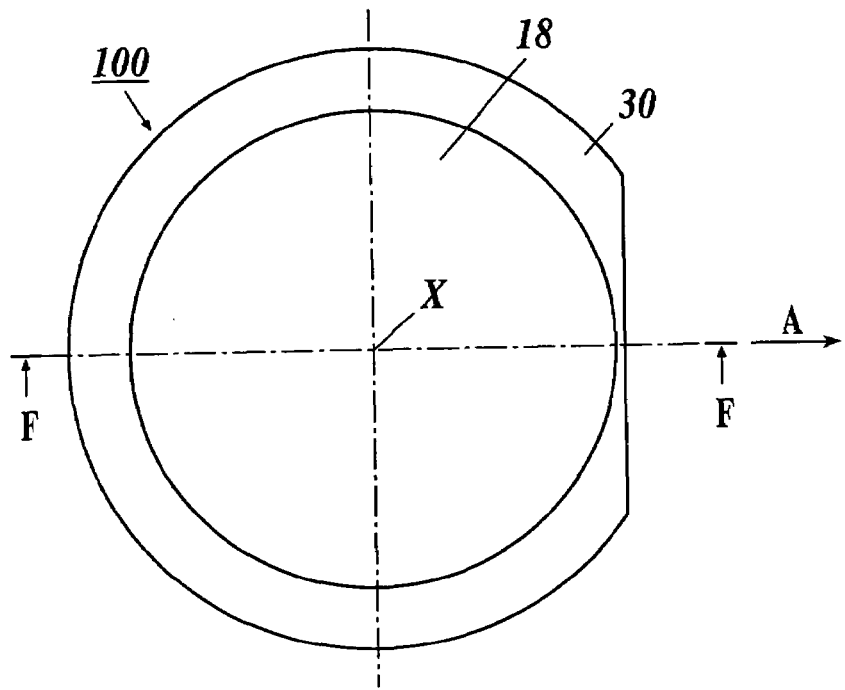
FIGS. 6A and 6B illustrate another example of the shape of the objective lens unit according to this embodiment.
Figure 6B:
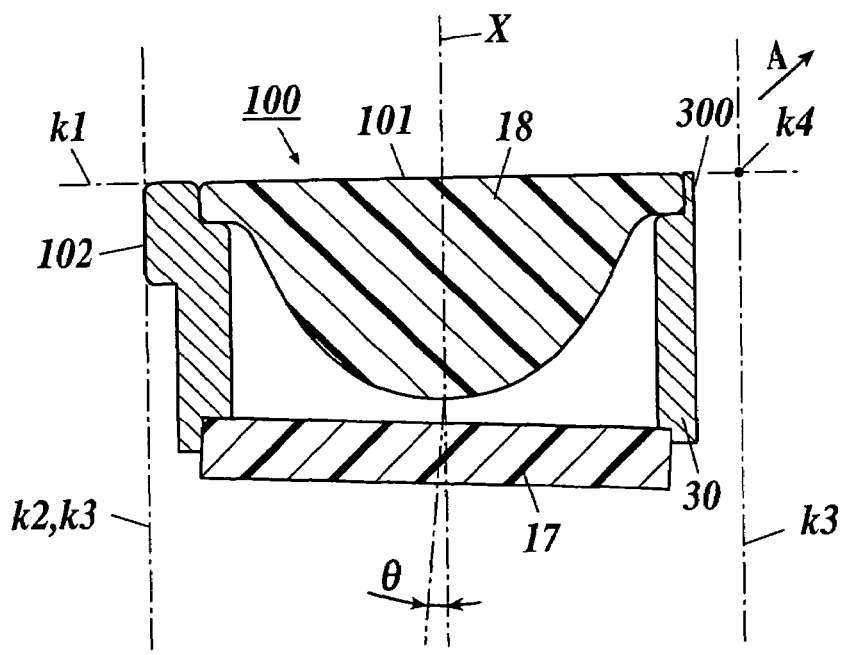

FIG. 6A and FIG. 6B illustrate another example of the shape of the objective lens unit 100 according to this embodiment. More specifically, FIG. 6A is a front view illustrating the objective lens unit 100 seen from a disc. FIG. 6B is a cross-sectional view illustrating the objective lens unit 100 cut at the line F-F shown in FIG. 6A.

As shown in FIG. 6A and FIG. 6B, a circular section of the lens frame 30 closer to a direction having the rotation center of the optical disc (direction shown by the arrow A) is cut so that this cut section provides a thinner thickness compared to a part away from the direction shown by the arrow A (i.e., parts other than the part closer to the direction shown by the arrow A). This shape also can provide the same effect as those as described above.

Alternatively, another structure also may be provided in the objective lens units shown in FIG. 4A, FIG. 4B, FIG. 6A, and FIG. 6B. Specifically, a part closer to the optical disc (direction A in the drawings) and a part opposite to the closer part with 180 degrees (which is at the left side of the cross-sectional views shown in FIG. 4B and FIG. 6B) also may have corner-rounded parts or parts having a reduced thickness (e.g., chamfered parts or stepped parts) having different shapes or sizes. This can minimize an unbalance of mass of the objective lens unit, thus providing a smooth swing by the wire suspensions. This also allows a user to check an inclination of an attached diffractive optical element without visually checking the diffractive optical element side.

Next, an example of an objective lens unit will be described in which a lens frame includes a projection section for positioning an objective lens in a direction perpendicular to the optical axis X except for the direction of the rotation center of an optical disc.

Figure 7A:
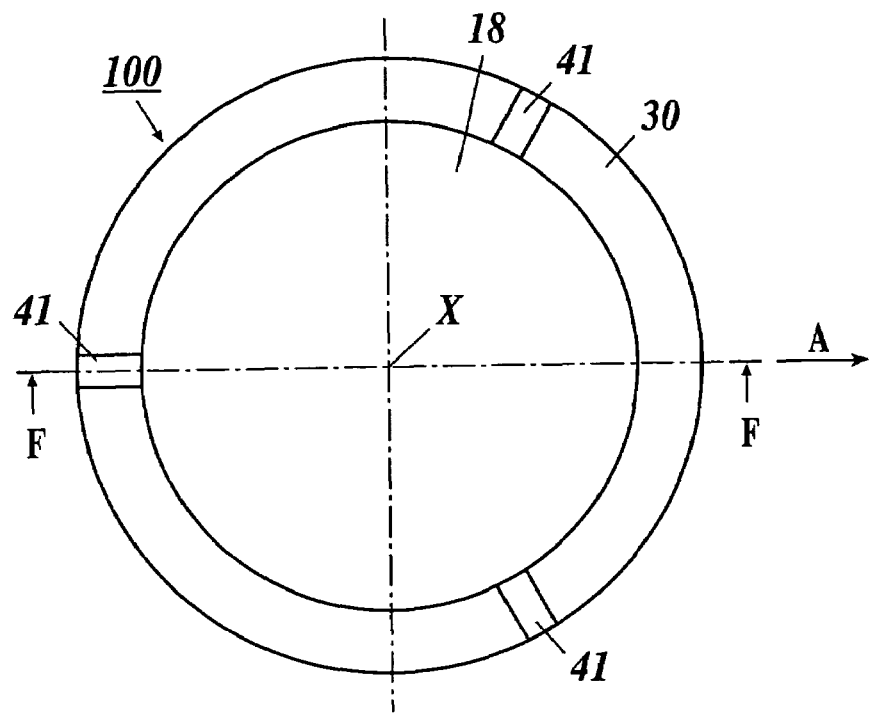
FIGS. 7A and 7B illustrate another example of the shape of the objective lens unit according to this embodiment.
Figure 7B:
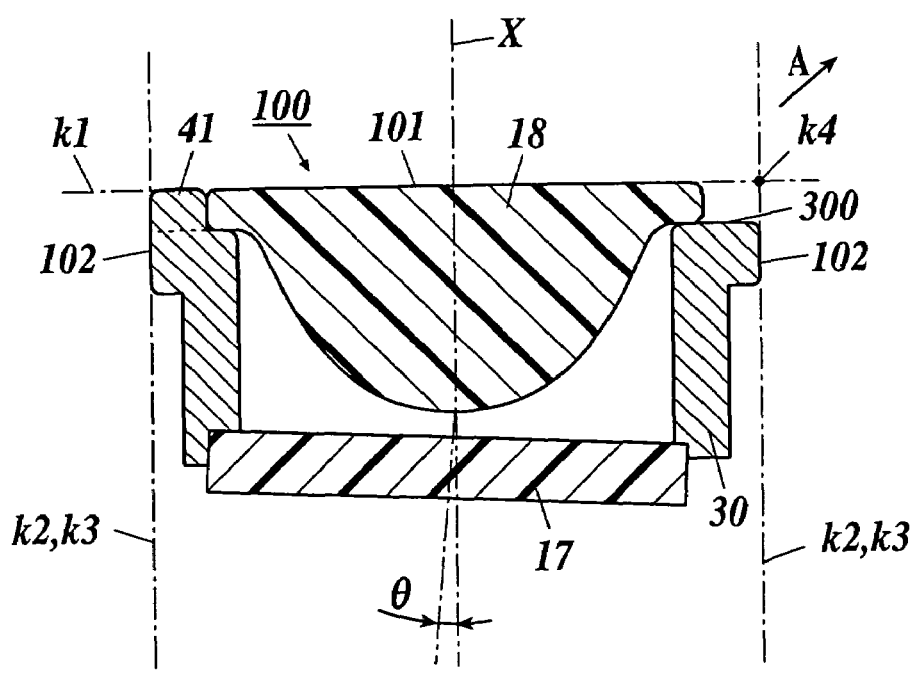

FIG. 7A and FIG. 7B illustrate another example of the shape of the objective lens unit 100 according to this embodiment. More specifically, FIG. 7A is a front view illustrating the objective lens unit 100 seen from a disc. FIG. 7B is a cross-sectional view illustrating the objective lens unit 100 cut at the line F-F shown in FIG. 7A.

As shown in FIG. 7A and FIG. 7B, the lens frame 30 includes three projection sections 41 for positioning the objective lens 18 in the direction perpendicular to the optical axis X so that the projection sections 41 are spaced with substantially 120 degrees. The projection sections 41 are provided so as not to be positioned in a direction having the rotation center of the optical disc (direction shown by "A" in FIG. 7A and FIG. 7B). Specifically, the projection section 41 is positioned at a position at which the projection section 41 does not protrude, in a direction of the rotation center of the optical disc, from an end section of the objective lens unit closest to the rotation center of the optical disc. The arrangement as described above also can provide the same effect as that as described above.

Although this example has described an example in which three projection sections are provided, the present invention is not limited to this. Thus, the projection sections also may be provided so as to position the objective lens in a direction perpendicular to the optical axis at a position avoiding the direction of the rotation center of the optical disc (direction of "A" in FIG. 7A and FIG. 7B).

Figure 8:
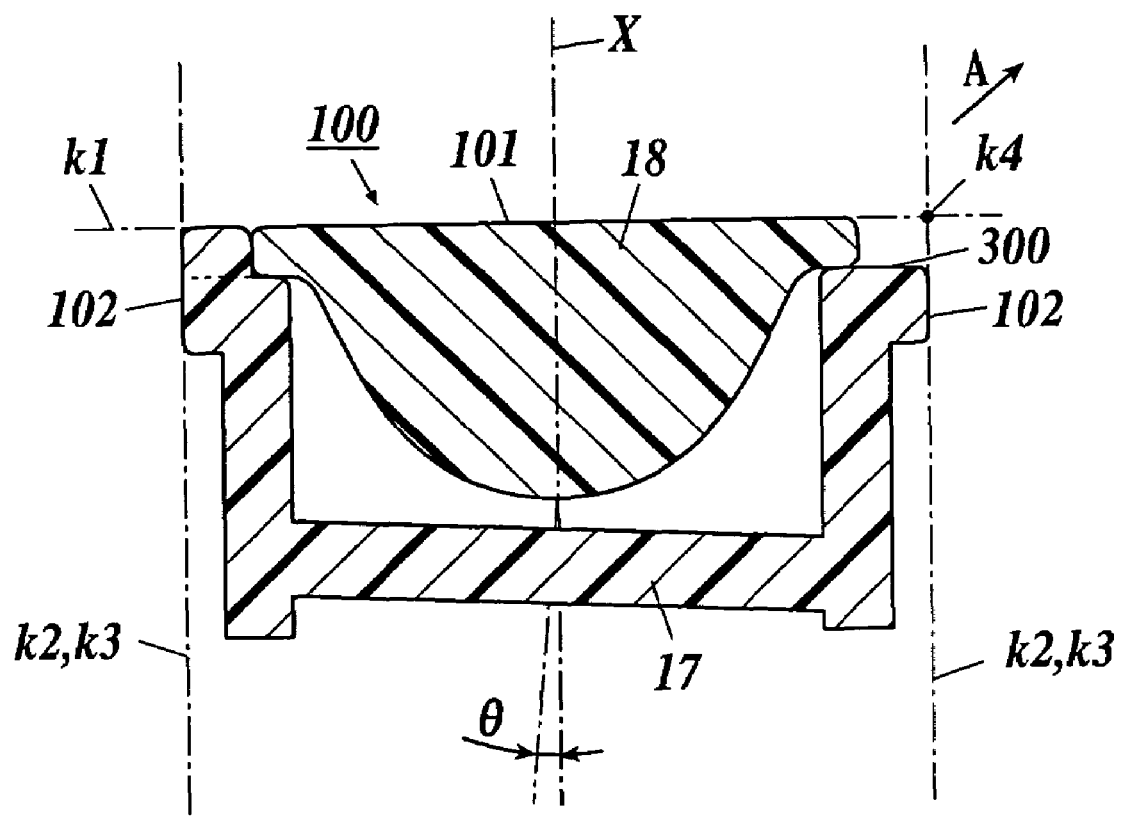
FIG. 8 illustrates another example of the shape of the objective lens unit according to this embodiment.

FIG. 8 illustrates another example of the objective lens unit 100 according to this embodiment. FIG. 8 is a cross-sectional view illustrating the diffractive optical element 17 and the lens frame 30 integrated in the objective lens unit shown in FIG. 7A and FIG. 7B.

As shown in FIG. 8, the integrated structure of the diffractive optical element 17 and the lens frame eliminates the positioning and the assembly steps of the diffractive optical element 17 and the lens frame, thus providing the objective lens unit with a low cost. The objective lens units described in connection with FIG. 4A to FIG. 6B also may use the integrated structure of the diffractive optical element 17 and the lens frame 30. Another structure also may be used in which the objective lens 18 and the lens frame 30 are integrated so that the objective lens 18 and the lens frame 30 are attached with the diffractive optical element 17.

Next, an example of an objective lens unit will be described in which an outer circumference of a flange section of an objective lens is exposed at a part of a lens frame at least closer to the rotation center of the optical disc.

Figure 9A:
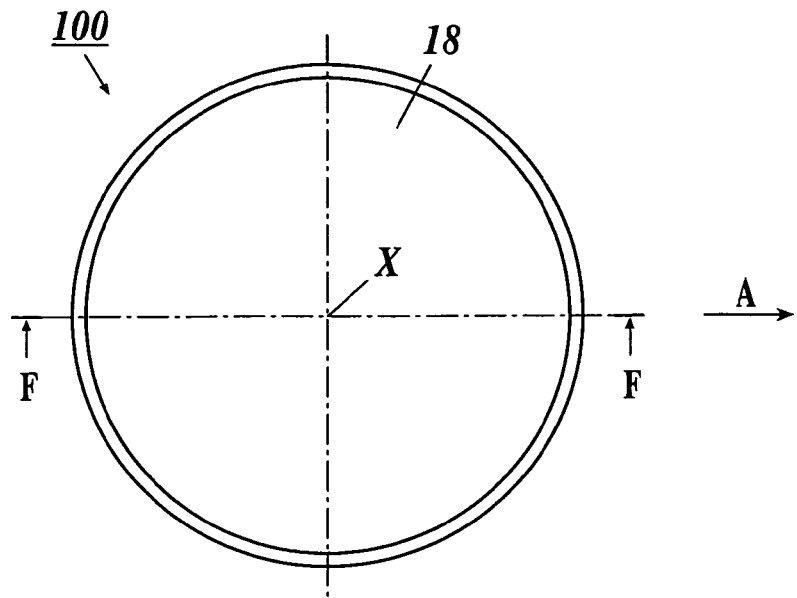
FIGS. 9A and 9B illustrate another example of the shape of the objective lens unit according to this embodiment.
Figure 9B:
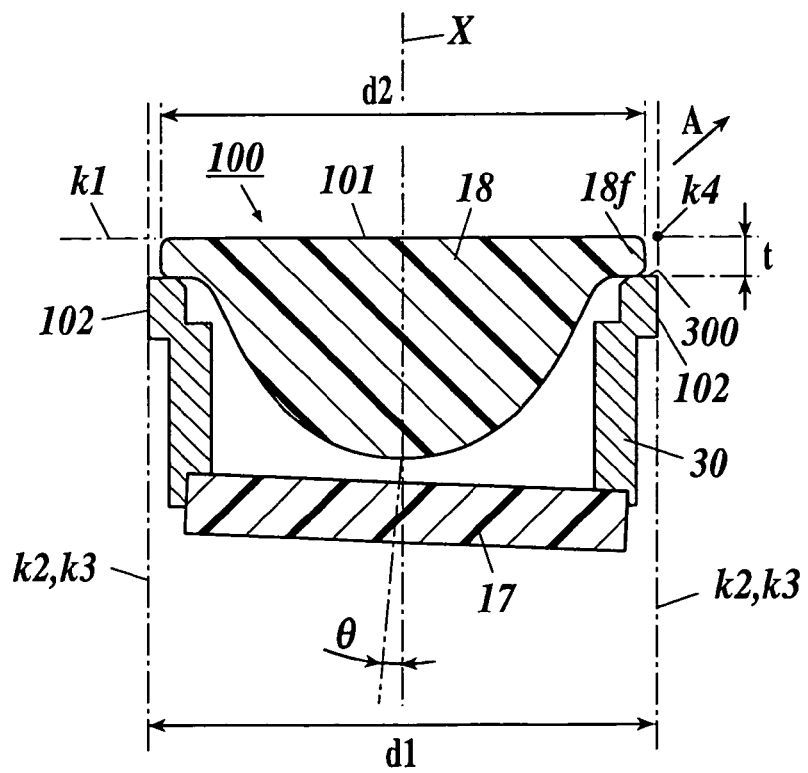

FIG. 9A and FIG. 9B illustrate another example of the shape of the objective lens unit 100 according to this embodiment. More specifically, FIG. 9A is a front view illustrating the objective lens unit 100 seen from a disc. FIG. 9B is a cross-sectional view illustrating the objective lens unit 100 cut at the line F-F shown in FIG. 9A.

As shown in FIG. 9A and FIG. 9B, the objective lens unit 100 comprises the diffractive optical element 17 and the objective lens 18 as well as the lens frame 30 for retaining the diffractive optical element 17 and the objective lens 18. The objective lens 18 includes a flange section 18$f$. This objective lens 18 is abutted with the lens frame 30 at a surface of the diffractive optical element 17 side as a surface of the flange section 18$f$ on a light source side and is centered to the diffractive optical element 17 previously fixed to the lens frame 30 and then is fixed and retained by adhesive agent for example. As shown in FIG. 9A and FIG. 9B, an edge section closer to the outer circumference of the flange section 18$f$ in the objective lens unit 100 is exposed.

A relation between a diameter d1 of the lens frame 30 and a diameter d2 of the objective lens 18 in FIG. 9B will be described. When assuming that a working distance to an optical disc for an application is WD and and the exposed flange section has a thickness "t" and when (Wd+t) is sufficiently higher than the protrusion height of the stack ring, the relation may be d1>d2 as shown in FIG. 9B. However, when (Wd+t) is close to the protrusion height of the stack ring, the relation is desirably determined as d1≦=d2. When (Wd+t) is smaller than the protrusion height of the stack ring, the relation is determined as d1≦d2.

As described above, the objective lens unit 100 is structured so that the objective lens 18 is retained by a surface of the flange section 18$f$ on a light source side and an edge section of the flange section 18$f$ on the outer circumference side is exposed. This can allow only the objective lens 18 to protrude from the optical head section to prevent elements other than the objective lens 18 from being adjacent to the stack ring. Thus, even when the objective lens unit 100 is moved to a position close to a stack ring, an interference therebetween can be avoided. Thus, the objective lens unit 100 can be positioned at a position close to the rotation center of a predetermined information recording region of the optical disc. As a result, even an objective lens unit having a short working distance (WD) can be prevented from having an interference with a stack ring and thus can record more information.

Although FIG. 9B illustrates an example in which the entire circumference of the flange section 18$f$ of the objective lens 18 is exposed, the present invention is not limited to this.

Another configuration also may be used in which only a part of the outer circumference of the flange section 18f closer to the rotation center of the optical disc (only a part in the direction "A" shown in FIG. 3B) is exposed.

Figure 10A:
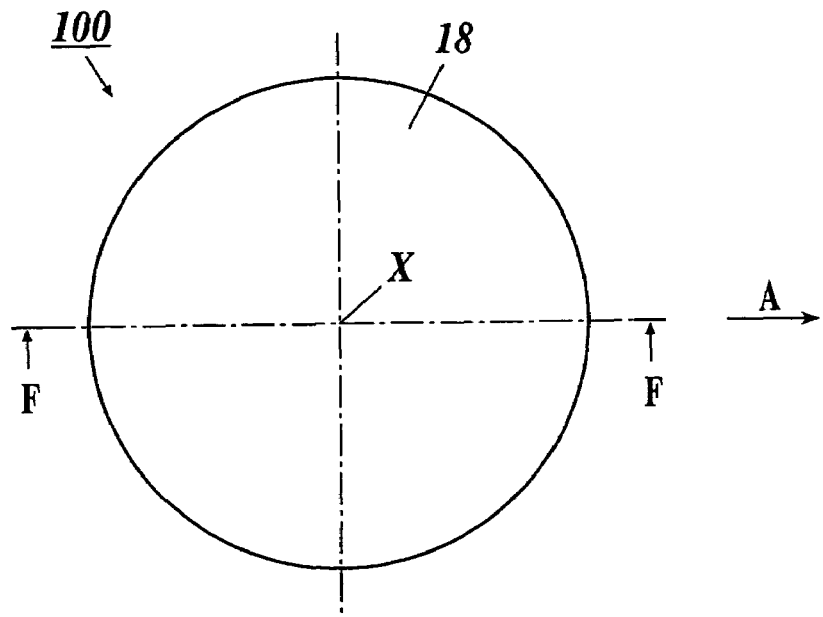
FIGS. 10A and 10B illustrate another example of the shape of the objective lens unit according to this embodiment.
Figure 10B:
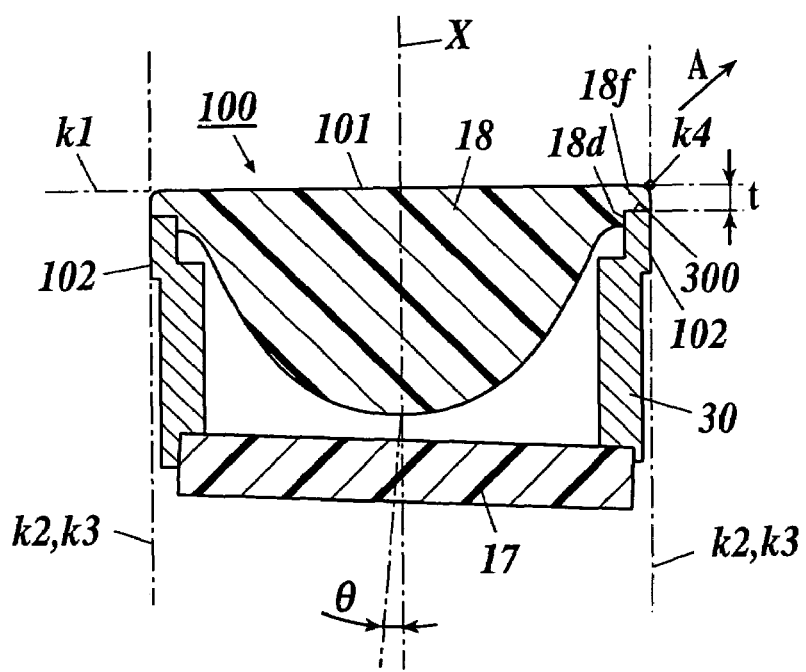

FIG. 10A and FIG. 10B illustrate another example of the shape of the objective lens unit 100 according to this embodiment. More specifically, FIG. 10A is a front view illustrating the objective lens unit 100 seen from a disc. FIG. 10B is a cross-sectional view illustrating the objective lens unit 100 cut at the line F-F shown in FIG. 10A.

As shown in FIG. 10A and FIG. 10B, a surface of the flange section 18f on the diffractive optical element 17 side, which is a surface of the flange section 18f of the objective lens 18 on a light source side, includes a step section 18d that is provided to be concentric with the outer circumference and that is engaged with the inner circumference of the lens frame 30. Thus, the objective lens 18 is positioned to the lens frame 30 in a direction perpendicular to the optical axis and is fixed by adhesive agent for example.

Although FIG. 10B shows the lens frame 30 having an identical diameter as that of the objective lens 18, the relation between the diameter of the lens frame 30 and the diameter of the objective lens 18 in this example is the same as that described in connection with FIG. 9A and FIG. 9B.

The structure as described above can eliminate the need for the centering to reduce the number of manufacture steps and the cost and also can allow only the objective lens 18 to protrude from an optical head section. Thus, the objective lens unit can be prevented from having an interference with a stack ring protruding from an information-reading surface of an optical disc. Thus, the objective lens unit can be at a position close to the rotation center of a predetermined information recording region of an optical disc. As a result, even an objective lens unit having a short working distance (WD) can be prevented from having an interference with the stack ring and can record more information.

Figure 11A:
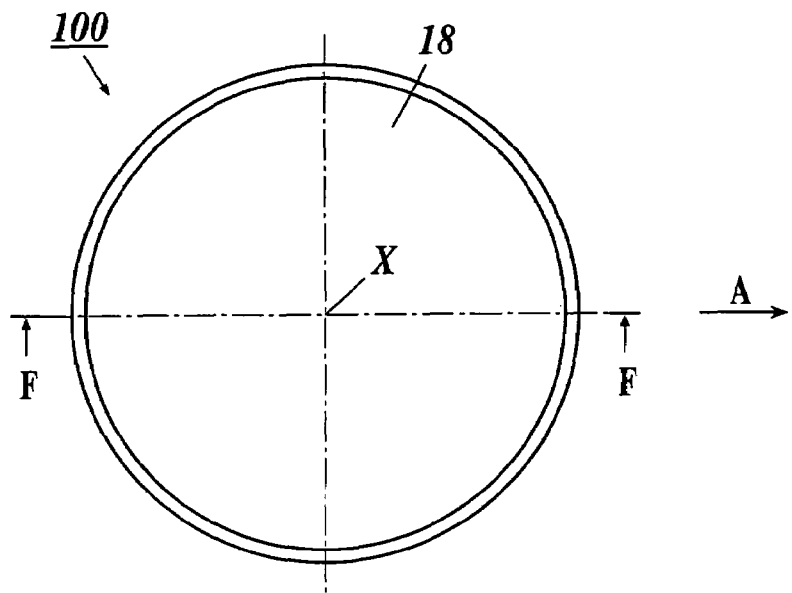
FIGS. 11A and 11B illustrate another example of the shape of the objective lens unit according to this embodiment.
Figure 11B:
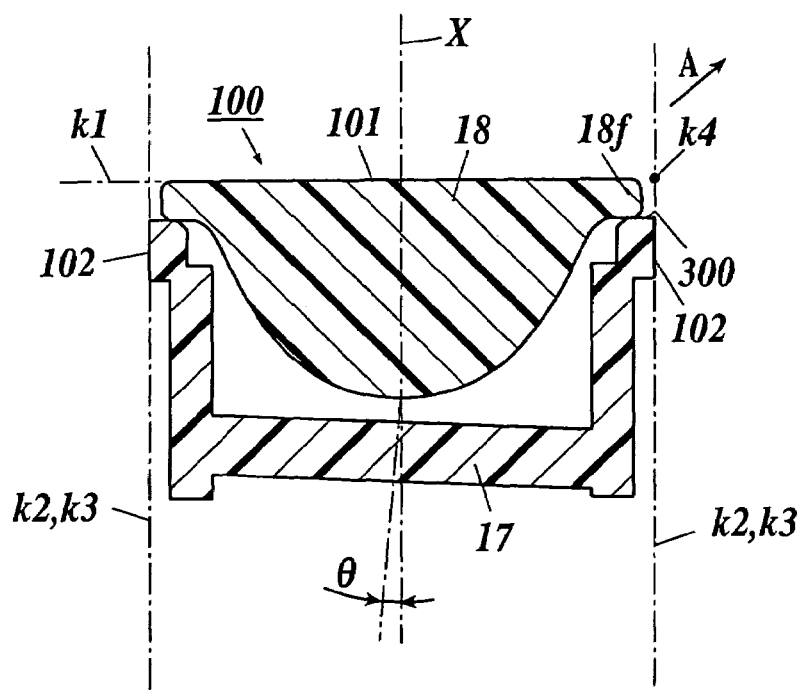
Figure 12:
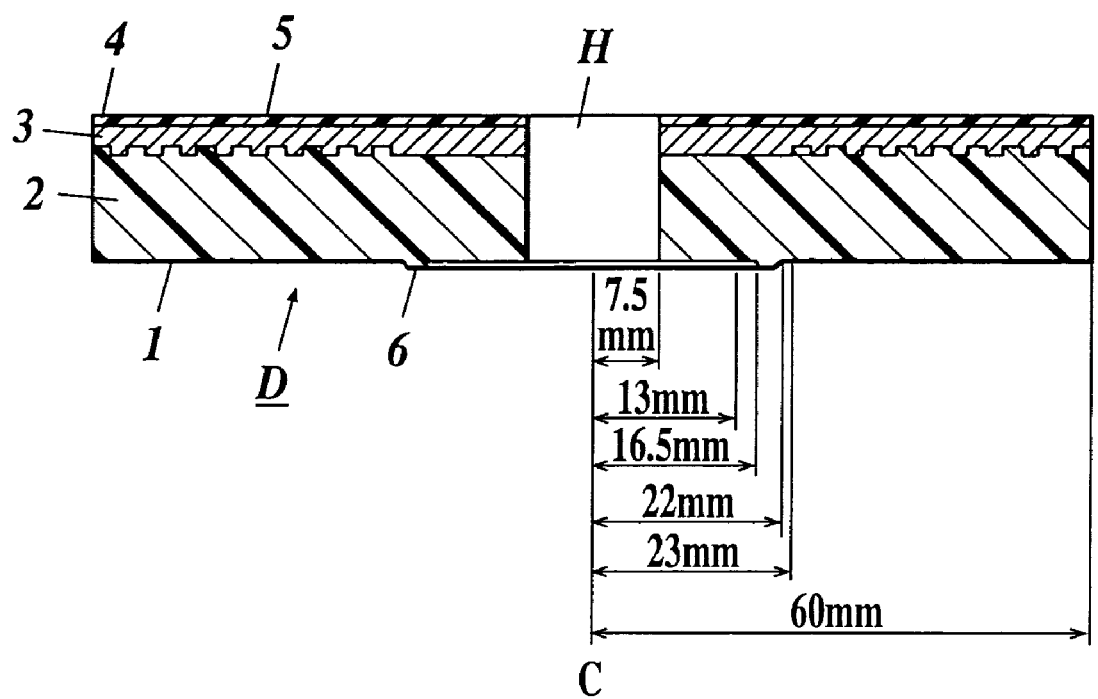
FIG. 12 is a view showing a schematic cross section of an optical disc in the thickness direction.

FIG. 11A and FIG. 11B illustrate another example of the objective lens unit 100 according to this embodiment. FIG. 11A and FIG. 11B are cross-sectional views illustrating the diffractive optical element 17 and the lens frame 30 integrated in the objective lens unit shown in FIG. 9A and FIG. 9B.

As shown in FIG. 11A and FIG. 11B, the integrated structure of the diffractive optical element 17 and the lens frame can eliminate the positioning and assembly steps of the diffractive optical element 17 and the lens frame, thus providing the objective lens unit with a low cost. The objective lens unit described in connection with FIG. 10A and FIG. 10B also may use the integrated structure of the diffractive optical element 17 and the lens frame 30. Another structure also may be used in which the objective lens 18 and the lens frame 30 are integrated so that the objective lens 18 and the lens frame 30 are attached with the diffractive optical element 17.

The diffractive optical element 17 shown in FIG. 4A to FIG. 11 is retained by the lens frame 30 with an inclination θ of about two to three degrees to the optical axis X for the purpose of reflecting surface reflection in an unnecessary direction. Thus, when the diffractive optical element 17 is formed to have a curved surface (e.g., concave surface), the diffractive optical element 17 is retained by the lens frame 30 with an inclination θ of about 0 (zero) degree.

Although the above embodiments have exemplarily described an objective lens unit in which a group of objective lenses comprise diffractive optical elements and convex lenses, the present invention is not limited to this. For example, a single lens or a group of objective lenses comprising a plurality of lenses also may be used. Although the above embodiments have exemplarily described an objective lens unit that can be used with a plurality types of optical discs, the present invention is not limited to this. The present invention also can be applied to an objective lens unit for a single optical disc.

The entire disclosure of Japanese Patent Application No.2005-239759 filed on Aug. 22, 2005 and Japanese Patent Application No.2005-244222 filed on Aug. 25, 2005, including the specification, claims, drawings, and abstract, is incorporated to a part of this application.

What is claimed is:

1. An objective lens unit, comprising:
an objective lens for irradiating and converging laser light on an optical disc as an a light information recording medium; and
a lens frame for retaining the objective lens,
wherein the lens frame is structured so that at least a portion closer to a rotation center of the optical disc is offset to an inner side of the lens frame with regards to a virtual edge section closer to the rotation center of the optical disc, wherein the virtual edge section is in a nodal line of a virtual plane that includes an end face which is closest to the optical disc in the lens frame and the objective lens, and that is perpendicular to an optical axis and a virtual rotation curved surface that is obtained when a virtual straight line passing a portion which is farthest from the optical axis in the lens frame and the objective lens, in parallel with the optical axis, is rotated around the optical axis as a center axis.

2. The objective lens unit of claim 1, wherein at least a part of an outer circumference section of the lens frame closer to the rotation center of the optical disc is corner-rounded.

3. The objective lens unit of claim 1, wherein a part of the lens frame closer to the rotation center of the optical disc has a reduced thickness.

4. The objective lens unit of claim 1, wherein the lens frame comprises a projection section for positioning the objective lens in a direction perpendicular to the optical axis except for a rotation center direction of the optical disc.

5. The objective lens unit of claim 1, wherein:
the objective lens comprises a flange section;
the lens frame retains the objective lens by a surface of the flange section on a light source side; and
an outer circumference of the flange section is exposed at at least a part of the lens frame closer to the rotation center of the optical disc.

6. The objective lens unit of claim 5, wherein the surface of the flange section on the light source side comprises an engagement section for engaging with the lens frame to position the objective lens in a direction perpendicular to the optical axis.

7. The objective lens unit of claim 1, wherein:
the objective lens unit comprises two optical elements; and
the lens frame is integrated with one of the optical elements.

8. An optical pickup device comprises a light source and an objective lens unit,
wherein the objective lens unit comprises:
an objective lens for irradiating and converging laser light on an optical disc as an a light information recording medium; and
a lens frame for retaining the objective lens,
wherein the lens frame is structured so that at least a portion closer to a rotation center of the optical disc is offset to an inner side of the lens frame with regards to a virtual edge section closer to the rotation center of the optical disc, wherein the virtual edge section is in a nodal line of a virtual plane that includes an end face which is closest to the optical disc in the lens frame and the objective lens, and that is perpendicular to an optical axis and a virtual rotation curved surface that is obtained when a virtual straight line passing a portion which is farthest from the optical axis in the lens frame and the objective lens, in parallel with the optical axis, is rotated around the optical axis as a center axis.

9. The optical pickup device of claim 8, wherein at least a part of an outer circumference section of the lens frame closer to the rotation center of the optical disc is corner-rounded.

10. The optical pickup device of claim 8, wherein a part of the lens frame closer to the rotation center of the optical disc has a reduced thickness.

11. The optical pickup device of claim 8, wherein the lens frame comprises a projection section for positioning the objective lens in a direction perpendicular to the optical axis except for a rotation center direction of the optical disc.

12. The optical pickup device of claim 8, wherein:
the objective lens comprises a flange section;
the lens frame retains the objective lens by a surface of the flange section on a light source side; and
an outer circumference of the flange section is exposed at at least a part of the lens frame closer to the rotation center of the optical disc.

13. The optical pickup device of claim 12, wherein the surface of the flange section on the light source side comprises an engagement section for engaging with the lens frame to position the objective lens in a direction perpendicular to the optical axis.

14. The optical pickup device of claim 8, wherein:
the objective lens unit comprises two optical elements; and
the lens frame is integrated with one of the optical elements.

* * * * *